(12) United States Patent
Valdez et al.

(10) Patent No.: US 9,753,835 B2
(45) Date of Patent: Sep. 5, 2017

(54) DEBUGGING PARALLEL GRAPHICAL PROGRAM CODE

(71) Applicant: NATIONAL INSTRUMENTS CORPORATION, Austin, TX (US)

(72) Inventors: Julian G. Valdez, Austin, TX (US); Benjamin R. Weidman, Austin, TX (US); Dustyn K. Blasig, Pfugerville, TX (US)

(73) Assignee: NATIONAL INSTRUMENTS CORPORATION, Austin, TX (US)

( * ) Notice: Subject to any disclaimer, the term of this patent is extended or adjusted under 35 U.S.C. 154(b) by 0 days.

(21) Appl. No.: 14/937,602

(22) Filed: Nov. 10, 2015

(65) Prior Publication Data

US 2017/0132108 A1 May 11, 2017

(51) Int. Cl.
G06F 9/44 (2006.01)
G06F 11/36 (2006.01)

(52) U.S. Cl.
CPC .................................. *G06F 11/362* (2013.01)

(58) Field of Classification Search
None
See application file for complete search history.

(56) References Cited

U.S. PATENT DOCUMENTS

| | | | |
|---|---|---|---|
| 5,048,018 A | 9/1991 | Bernstein | |
| 5,361,352 A | 11/1994 | Iwasawa | |
| 6,279,104 B1 | 8/2001 | Sato | |
| 7,007,268 B2 | 2/2006 | Emberson | |
| 7,302,675 B2 | 11/2007 | Rogers | |
| 8,291,390 B2 | 10/2012 | Ilic | |
| 8,458,653 B2 | 6/2013 | Hudson | |
| 8,881,106 B2 | 11/2014 | Lachner | |
| 9,081,583 B2 | 7/2015 | Kee | |
| 9,135,143 B2 | 9/2015 | Correll | |
| 9,189,215 B1 | 11/2015 | Riche | |
| 2003/0046663 A1* | 3/2003 | Rogers | G06F 11/3664 717/125 |
| 2004/0031019 A1 | 2/2004 | Lamanna | |
| 2005/0257195 A1* | 11/2005 | Morrow | G06F 8/34 717/109 |
| 2008/0022259 A1* | 1/2008 | MacKlem | G06F 8/34 717/113 |

* cited by examiner

*Primary Examiner* — Qamrun Nahar
(74) *Attorney, Agent, or Firm* — Meyertons Hood Kivlin Kowert & Goetzel, P.C.; Jeffrey C. Hood; Mark S. Williams

(57) ABSTRACT

System and method for debugging a graphical program. A graphical program may be received, e.g., from storage, from another process or device, etc. The program includes parallel graphical program portions, each portion including a graphical program structure and/or an execution path in the graphical program. A first graphical program portion of the parallel graphical program portions may be single step debugged, including executing the single step in the first graphical program portion, and executing, in the background, code in each of the other graphical program portions that is scheduled to execute between start and end of the single step in the first graphical program portion.

20 Claims, 14 Drawing Sheets

DEBUGGING PARALLEL GRAPHICAL PROGRAM CODE

FIELD OF THE INVENTION

The present invention relates to the field of graphical programming, and more particularly to debugging parallel graphical program code.

DESCRIPTION OF THE RELATED ART

Graphical programming has become a powerful tool available to programmers. Graphical programming environments such as the National Instruments Corporation's LabVIEW™ product have become very popular. Tools such as LabVIEW™ have greatly increased the productivity of programmers, and increasing numbers of programmers are using graphical programming environments to develop their software applications. In particular, graphical programming tools are being used for test and measurement, data acquisition, process control, human machine interface (HMI), supervisory control and data acquisition (SCADA) applications, modeling, simulation, image processing/machine vision applications, and motion control, among others.

One of the common features employed in debugging computer programs is the ability to single step through the code in order to observe changes that occur at particular points within a program's execution. In text based languages, this can take the form of stepping from one line to the next with each single step operation causing the code represented by the current line to execute, then pausing the program. This linear execution is easy to understand given that a textual description of computer code (i.e., textual source code) is, itself, linear.

In a graphical programming language, however, the representation of the code may not easily lend itself to linear interpretation. Such a code graph may contain many branches of execution where execution may proceed from a given node along any number of parallel paths. In such cases, the behavior of the single step operation may be implemented in a number of ways of varying utility.

One implementation of the operation may be to execute the current node, then move to whichever node happens to come next in the execution order, and then pause the program. If the graphical program contains many parallel paths, the observed execution may jump from one path to another, making it difficult for the programmer to focus on the code of interest.

Accordingly, improved techniques for debugging parallel graphical program code are desired.

SUMMARY OF THE INVENTION

Various embodiments of a system and method for debugging parallel graphical program code are presented below.

A graphical program may be received, e.g., from storage, from another process or device, etc., where the program includes parallel graphical program portions. Each graphical program portion may include at least one of a graphical program structure or an execution path in the graphical program. In some embodiments, the graphical program may include a plurality of interconnected nodes or icons that visually indicate functionality of the program. The interconnected nodes or icons may thus be graphical source code for the program. Graphical function nodes may also be referred to as blocks, e.g., function blocks. In some embodiments, the graphical program may be a graphical data flow program.

A first graphical program portion of the parallel graphical program portions may be single step debugged. In some embodiments, single step debugging the first graphical program portion may include executing the single step in the first graphical program portion, and executing, in the background, code in each of the other graphical program portions that is scheduled to execute between start and end of the single step in the first graphical program portion. Single step execution refers to beginning execution from a paused state at a first code element in a program portion, executing the first code element, then pausing at an immediately subsequent second code element in the program portion, e.g., per data flow order, or along a selected execution branch.

In some embodiments, the method may include displaying, on a display device, e.g., via a graphical user interface (GUI), results from the single step debugging, including displaying one or more of: results from said executing the single step, or results from said executing, in the background, the code in each of the other graphical program portions that is scheduled to execute between start and end of the single step in the first graphical program portion. Thus, embodiments of the present techniques may enable the user to single step through graphical program code and observe changes or results in a first graphical program portion while allowing parallel code in the other graphical program portions to execute in the background. In some embodiments, the method may also allow the user to view results from the background execution. For example, the user may specify to the GUI whether to present such "background" results, and the GUI may display such results accordingly, e.g., in a respective window or in respective windows. In one embodiment, results may be annotated to indicate which graphical program portion produced the results.

The above single step debugging may be performed in any of multiple ways. For example, in one embodiment, the first graphical program portion includes a first graphical subprogram, and single step debugging the first graphical program portion includes single step debugging through the first graphical subprogram. In a further embodiment, single step debugging through the first graphical subprogram may include beginning execution from a paused state at a first code element in the first graphical subprogram, executing the first code element, then pausing at an immediately subsequent second code element in the first graphical subprogram, and executing, in the background, all pending code in the graphical program that is not in the first graphical subprogram, and that is concurrent with the first code element or that is scheduled to execute between the first code element and the second code element.

In some embodiments, at least one of the parallel graphical program portions includes a graphical subprogram defined by at least one of: a top level block diagram of the graphical program, at least one loop, at least one clock-driven loop, at least one sequence structure, at least one case structure, at least one replication structure, or at least one nested structure. Thus, for example, a parallel graphical program structure may include nested replication structures.

Thus, some embodiments of the above technique may enable the user to single step through graphical program code and observe changes or results in a single graphical subprogram while allowing parallel code to execute in the background.

In another embodiment, the first graphical program portion may include a first execution path, and single step debugging the first graphical program portion may include single step debugging through the first execution path. For example, in one particular embodiment, single step debugging through the first execution path may include beginning execution from a paused state at a first code element in the first execution path, executing the first code element, then pausing at an immediately subsequent second code element in the first execution path, and executing, in the background, all pending code in the graphical program that is concurrent with the first code element or that is scheduled to execute between the first code element and the second code element.

In some embodiments, the graphical program may include an execution branch point, i.e., where the execution path forks or ramifies, into parallel execution paths. For example, in one embodiment, the first execution path includes an execution branch point, and single step debugging through the first execution path may further include receiving user input selecting an execution branch of the execution branch point, where the first execution path includes the selected execution branch, and where all pending code includes any unselected execution branches of the execution branch point.

Thus, at least some of the first execution path may be determined at runtime based on user input, and so the subsequent or next code element in the first execution path after the execution branch point may not be known until then. For example, when the execution branch is encountered in the execution of the graphical program, e.g., prior to, during, or just after execution of the code element at the current position, a prompt may be presented to the user requesting disambiguation of the execution branch point, i.e., selection of one of the presented execution branches, and in response to user input disambiguating the execution branching, i.e., selecting or indicating one of the execution branches, may designate the immediately subsequent (next) code element along the selected execution branch as the subsequent position, i.e., the second code element, in the first execution path, and may proceed as described above. Note that the user input may be received in any of various ways, e.g., via a specific key press or key combination, via a pointing device, e.g., a mouse click on a candidate node or path, selection of an entry in a menu of candidate nodes or paths, and so forth, as desired.

Thus, some embodiments of the above technique may enable the user to single step through graphical program code and observe changes or results in a single execution path while allowing parallel code to execute in the background.

BRIEF DESCRIPTION OF THE DRAWINGS

A better understanding of the present invention can be obtained when the following detailed description of the preferred embodiment is considered in conjunction with the following drawings, in which.

Figure 1A:
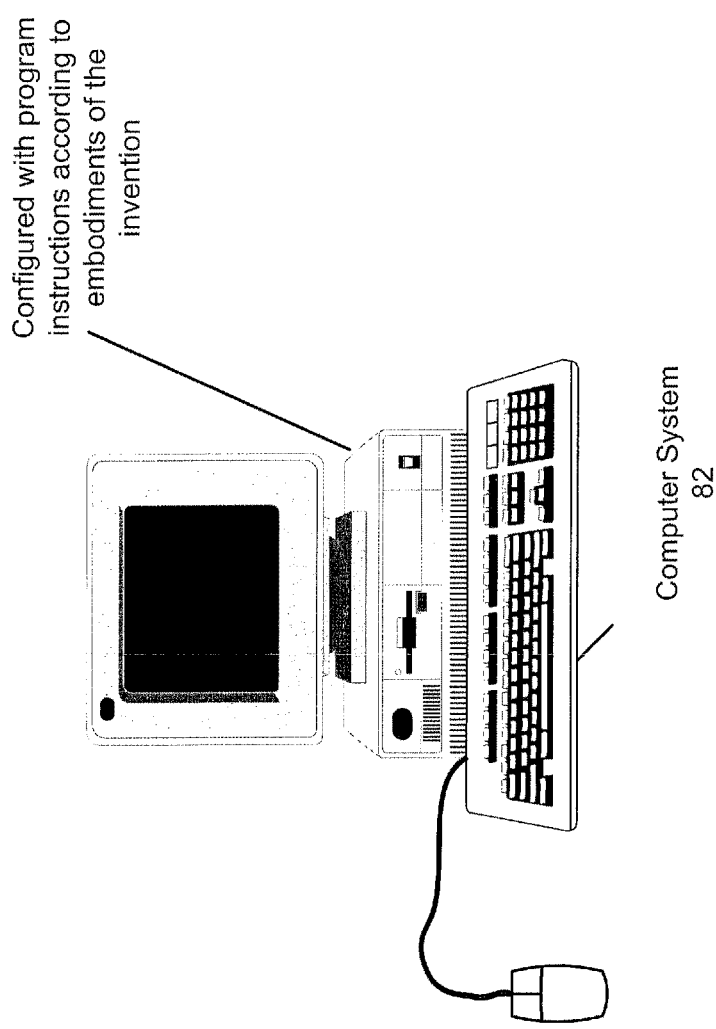
FIG. 1A illustrates a computer system configured to create and execute a graphical program according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,210,117 titled "System and Method for Programmatically Generating a Graphical Program in Response to Program Information," filed Dec. 20, 2000.

U.S. application Ser. No. 14/937,732 titled "Replication Structure in a Graphical Programming Language", filed Nov. 10, 2015.

Terms

The following is a glossary of terms used in the present application:

Memory Medium—Any of various types of non-transitory computer accessible memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DIADem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Said another way, data flow programs execute according to a data flow model of computation under which program functions are scheduled for execution in response to their necessary input data becoming available. Data flow programs can be contrasted with procedural programs, which specify an execution flow of computations to be performed.

As used herein "data flow" or "data flow programs" refer to "dynamically-scheduled data flow" and/or "statically-defined data flow".

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW™ VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the HMI (Human Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system)

analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Wireless—refers to a communications, monitoring, or control system in which electromagnetic or acoustic waves carry a signal through space rather than along a wire.

Approximately—refers to a value being within some specified tolerance or acceptable margin of error or uncertainty of a target value, where the specific tolerance or margin is generally dependent on the application. Thus, for example, in various applications or embodiments, the term approximately may mean: within 0.1% of the target value, within 0.2% of the target value, within 0.5% of the target value, within 1%, 2%, 5%, or 10% of the target value, and so forth, as required by the particular application of the present techniques.

Proximate—near to; For example, proximate may mean within some specified distance, or within some specified fraction of a distance. Note that the actual threshold for being proximate is generally application dependent. Thus, in various applications, proximate may mean being within 1 mm, 1 inch, 1 foot, 1 meter, 1 mile, etc. of some reference point or object, or may refer to being within 1%, 2%, 5%, 10%, etc., of a reference distance from some reference point or object.

Optimization—refers to the technical process of determining or selecting a best or improved element or configuration from a set of available alternatives with regard to some specified criteria (e.g., an objective function, and possibly constraints), and generally within some specified tolerance. Note that in practical use, an optimized system (or process) is improved (with respect to specified criteria), but may or may not be the absolute best or ideal solution. Said another way, optimization operates to improve a system or process, and may approach the mathematically optimum solution to within some tolerance, which may be dependent on the application, e.g., within 1%, 2%, 5%, 10%, etc., of the mathematically optimal solution. Thus, as used herein, the terms "optimized", "optimum", and "optimal" mean "improved with respect to specified criteria".

Global Optimization—refers to a type of optimization in which a system or process with interdependent components or sub-processes is improved by varying multiple parameters or aspects of the system or process at the same time, generally with non-linear results. Note that ideal global optimization (finding the mathematically globally optimum solution) is generally intractable, because in even moderately complex systems and processes there are many more possible configurations and resulting behaviors than can be searched or considered in a reasonable amount of time. Thus, practically, global optimization operates to improve a complex system or process by varying multiple parameters concurrently, and may approach the mathematically globally optimum solution to within some tolerance, which may be dependent on the application, e.g., within 1%, 2%, 5%, 10%, etc., of the mathematically globally optimal solution. Thus, as used herein, the terms "globally optimized", "globally optimum", and "globally optimal" mean "globally improved with respect to specified criteria". One example of a global optimization method is differential evolution, which optimizes a problem (system or process) via iterative improvement of candidate solutions with respect to some specified measure of quality.

Single Step Execution—refers to beginning execution from a paused state at a first code element in a program portion, executing the first code element, then pausing at an immediately subsequent second code element in the program portion, e.g., per data flow order, or along a selected execution branch.

Side effect—refers to an observable or detectable change made or caused by a code portion outside its scope. Examples of common side effects include changing the state of variables owned by outer scopes or at a global scope, reading and writing data to files, passing data to other processes, temporal control of code in its own or another code portion (e.g., where code elements in a first portion of code effect the times at which they or other code executes), throwing errors or exceptions, allocating and deallocating memory, and reading and writing IO, among others. Optimizing code with side effects is difficult since the compiler must ensure the program will operate in a manner that maintains the same observable behavior as the original application.

FIG. 1A—Computer System

FIG. 1A illustrates a computer system 82 configured to execute and debug a graphical program, according to embodiments of the present techniques. Embodiments of a technique for debugging parallel graphical program code are described below.

As shown in FIG. 1A, the computer system 82 may include a display device configured to display the graphical program as the graphical program is created and/or executed. The display device may also be configured to display a graphical user interface or front panel of the graphical program during execution of the graphical program. The graphical user interface may comprise any type of graphical user interface, e.g., depending on the computing platform.

The computer system 82 may include a functional unit, and at least one memory medium on which one or more computer programs or software components according to one embodiment of the present invention may be stored. For example, the memory medium may store one or more graphical programs which are executable to perform the methods described herein. Additionally, the memory medium may store a graphical programming development environment application used to create and/or execute such graphical programs in accordance with the techniques disclosed herein. The memory medium may also store operating system software, as well as other software for operation of the computer system. Various embodiments further include receiving or storing instructions and/or data implemented in accordance with the foregoing description upon a carrier medium.

Figure 1B:
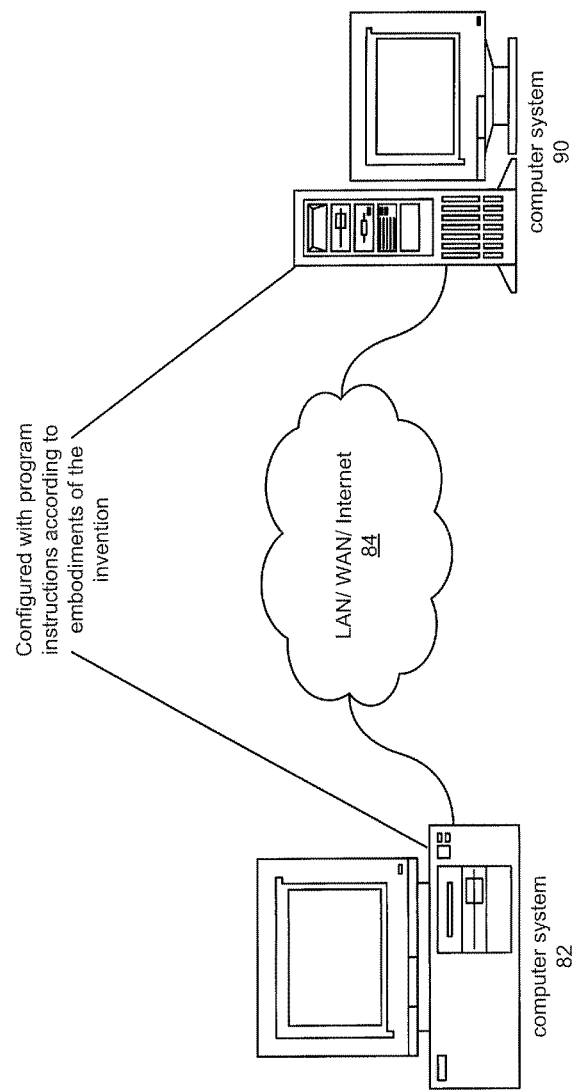
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a graphical program in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device coupled to the computer system 82. The device may include a programmable hardware element and/or may include a processor and memory medium which may execute a real time operating system. In one embodiment, the graphical program may be downloaded and executed on the device. For example, an application development environment with which the graphical program is associated may provide support for downloading a graphical program for execution on the device in a real time system.

More generally, embodiments of the techniques described herein may be implemented in, on, or by any type of hardware desired, e.g., one or more CPUs (central processing units), GPU's (graphics processing units), FPGAs (field programmable gate arrays), separate computers on a network, cloud based systems, ASICs (application specific integrated circuits), and so forth.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that embodiments of the present invention can be used for a plethora of applications and is not limited to the above applications. In other words, applications discussed in the present description are exemplary only, and embodiments of the present invention may be used in any of various types of systems. Thus, embodiments of the system and method of the present invention is configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
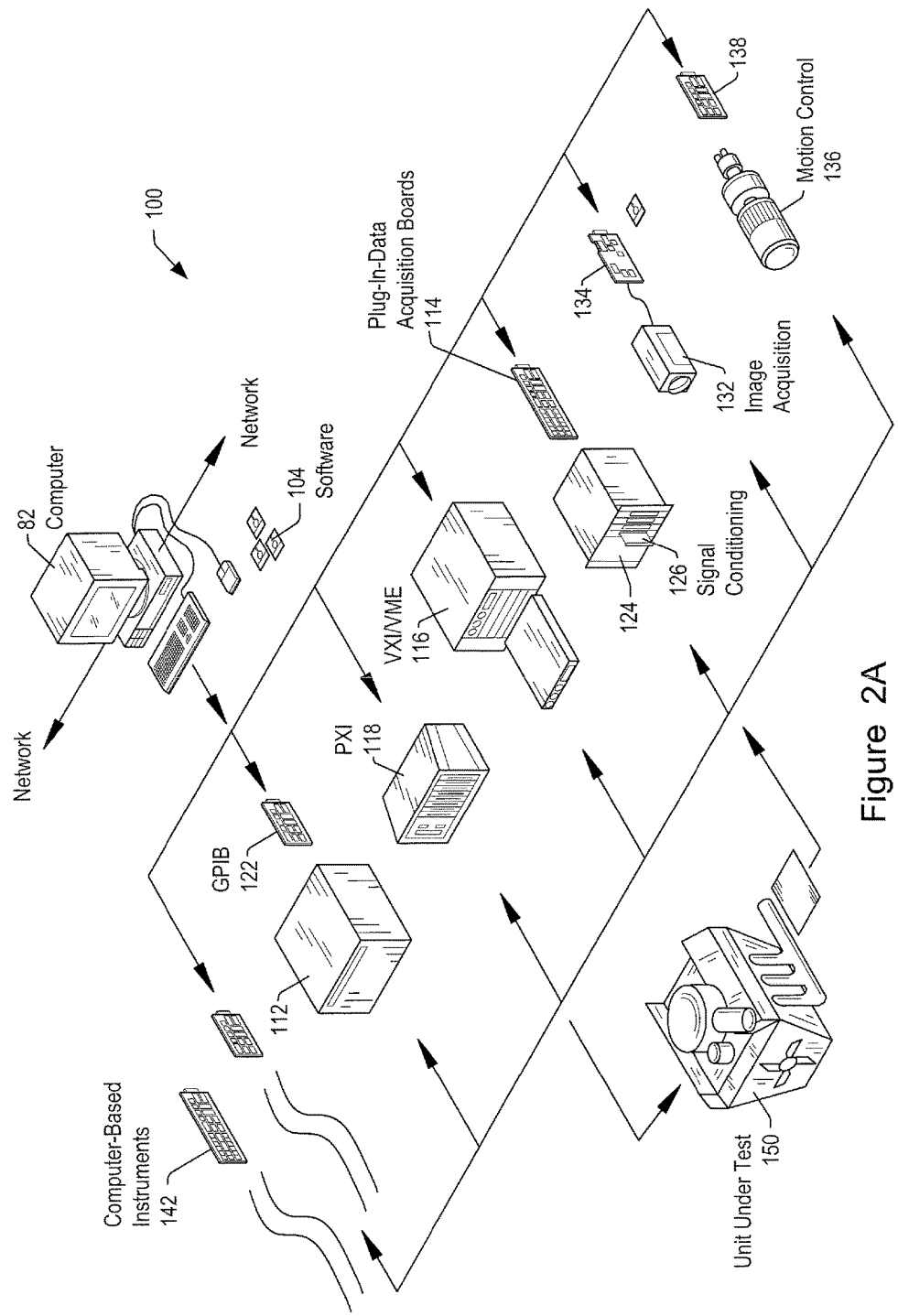
FIG. 2A illustrates an instrumentation control system according to one embodiment of the invention.

FIG. 2A illustrates an exemplary instrumentation control system 100 which may implement embodiments of the invention. The system 100 comprises a host computer 82 which couples to one or more instruments. The host computer 82 may comprise a CPU (or more generally, a functional unit), a display screen, memory, and one or more input devices such as a mouse or keyboard as shown. The computer 82 may operate with the one or more instruments to analyze, measure or control a unit under test (UUT) or process 150, e.g., via execution of software 104.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
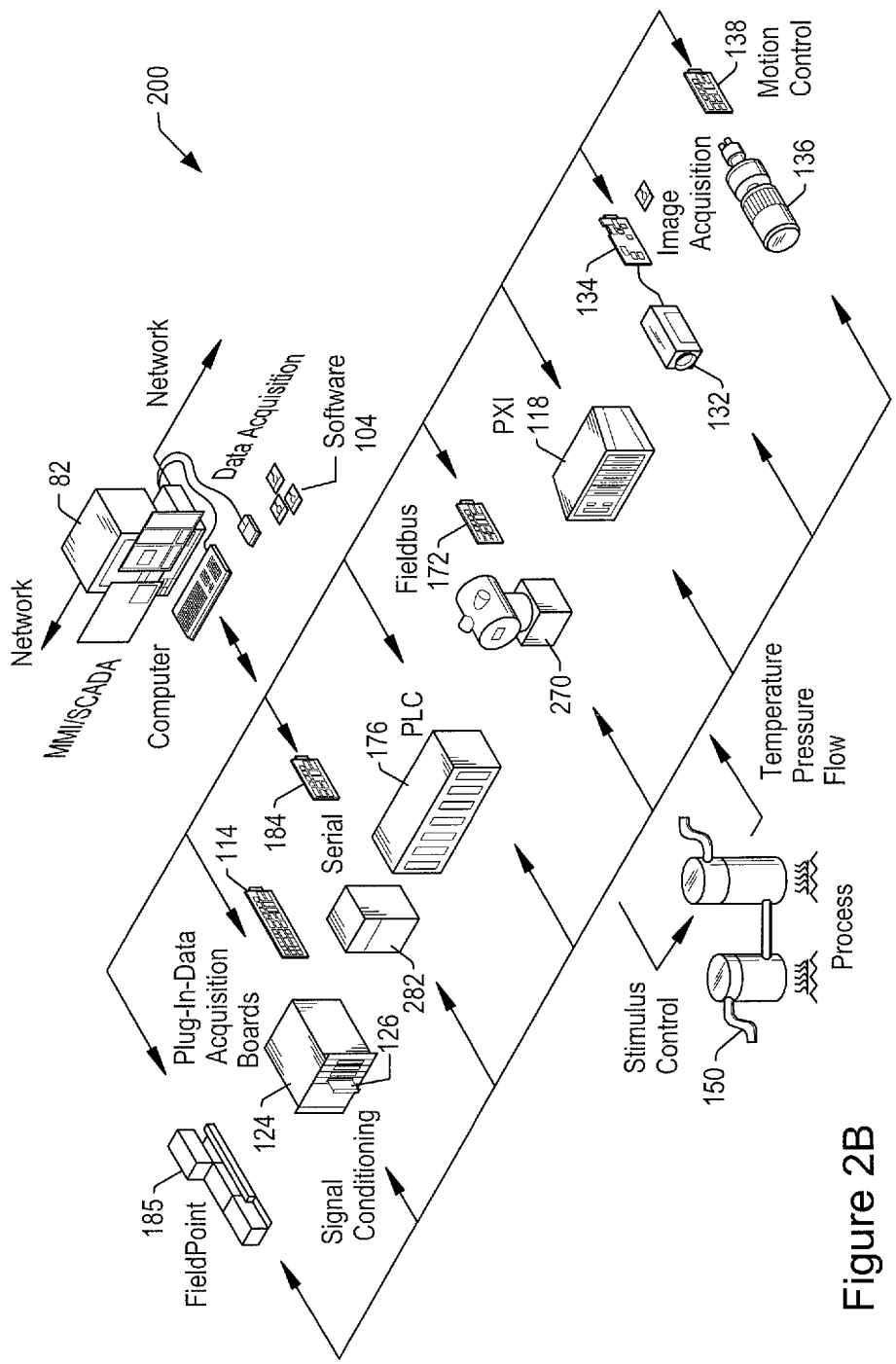
FIG. 2B illustrates an industrial automation system according to one embodiment of the invention.

FIG. 2B illustrates an exemplary industrial automation system 200 which may implement embodiments of the invention. The industrial automation system 200 is similar to the instrumentation or test and measurement system 100 shown in FIG. 2A. Elements which are similar or identical to elements in FIG. 2A have the same reference numerals for convenience. The system 200 may comprise a computer 82 which couples to one or more devices or instruments. The computer 82 may comprise a CPU (or more generally, a functional unit), a display screen, memory, and one or more input devices such as a mouse or keyboard as shown. The computer 82 may operate with the one or more devices to perform an automation function with respect to a process or device 150, such as HMI (Human Machine Interface), SCADA (Supervisory Control and Data Acquisition), portable or distributed data acquisition, process control, advanced analysis, or other control, among others, e.g., via execution of software 104.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 270 and associated fieldbus interface card 172, a PLC (Programmable Logic Controller) 176, a serial instrument 282 and associated serial interface card 184, or a distributed data acquisition system, such as Fieldpoint system 185, available from National Instruments Corporation, among other types of devices.

Figure 3A:
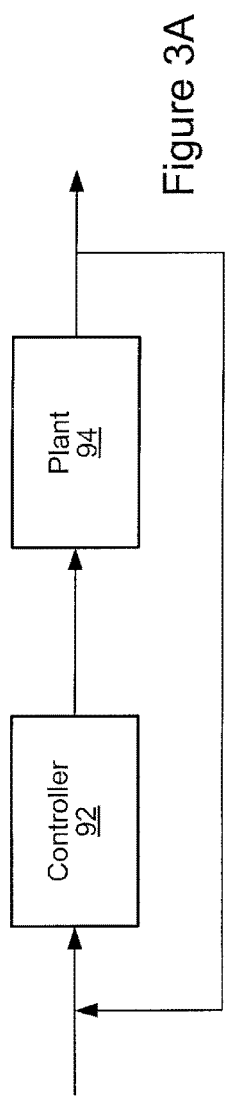
FIG. 3A is a high level block diagram of an exemplary system which may execute or utilize graphical programs.

FIG. 3A is a high level block diagram of an exemplary system which may execute or utilize graphical programs. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

Figure 3B:
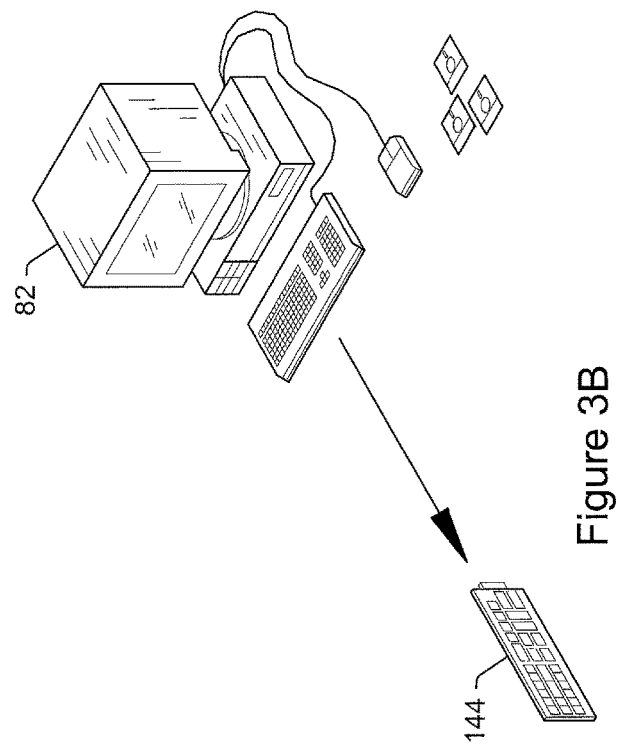
FIG. 3B illustrates an exemplary system which may perform control and/or simulation functions utilizing graphical programs.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

Figure 4:
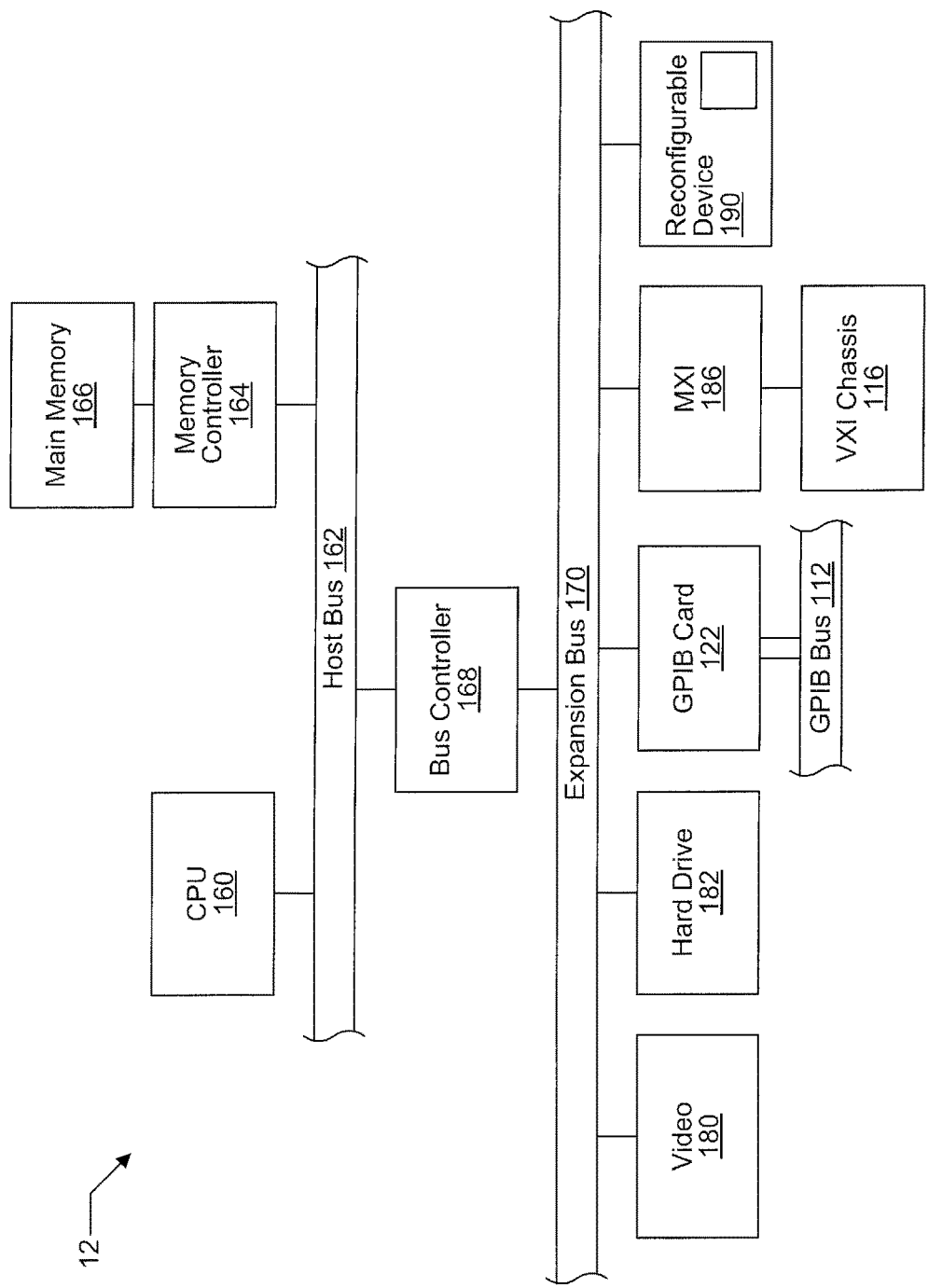
FIG. 4 is an exemplary block diagram of the computer systems of FIGS. 1A, 1B, 2A and 2B and 3B.

FIG. 4—Computer System Block Diagram

FIG. 4 is a block diagram 12 representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. Additionally, or alternatively, in some embodiments, the computer may include a functional unit. A memory medium, typically comprising RAM and referred to as main memory, 166 is coupled to the host bus 162 by means of memory controller 164. The main memory 166 may store a graphical program development environment, such as LabVIEW™ provided by National Instruments Corporation, as well as a graphical program configured per the techniques disclosed herein. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170. The computer 82 may also comprise a GPIB card 122 coupled to a GPIB bus 112, and/or an MXI device 186 coupled to a VXI chassis 116.

As shown, a device 190 may also be connected to the computer. The device 190 may include a processor and memory which may execute a real time operating system. The device 190 may also or instead comprise a programmable hardware element. The computer system may be configured to deploy a graphical program to the device 190 for execution of the graphical program on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Overview: Debugging Parallel Graphical Program Code

Embodiments of the debugging techniques disclosed herein may provide an approach to debugging parallel graphical program portions that allows the user to single step through a first graphical program portion, while executing code in the other graphical program portions that is scheduled to execute during each single step in the background.

A detailed description of embodiments of the debugging techniques are now presented.

Figure 5:
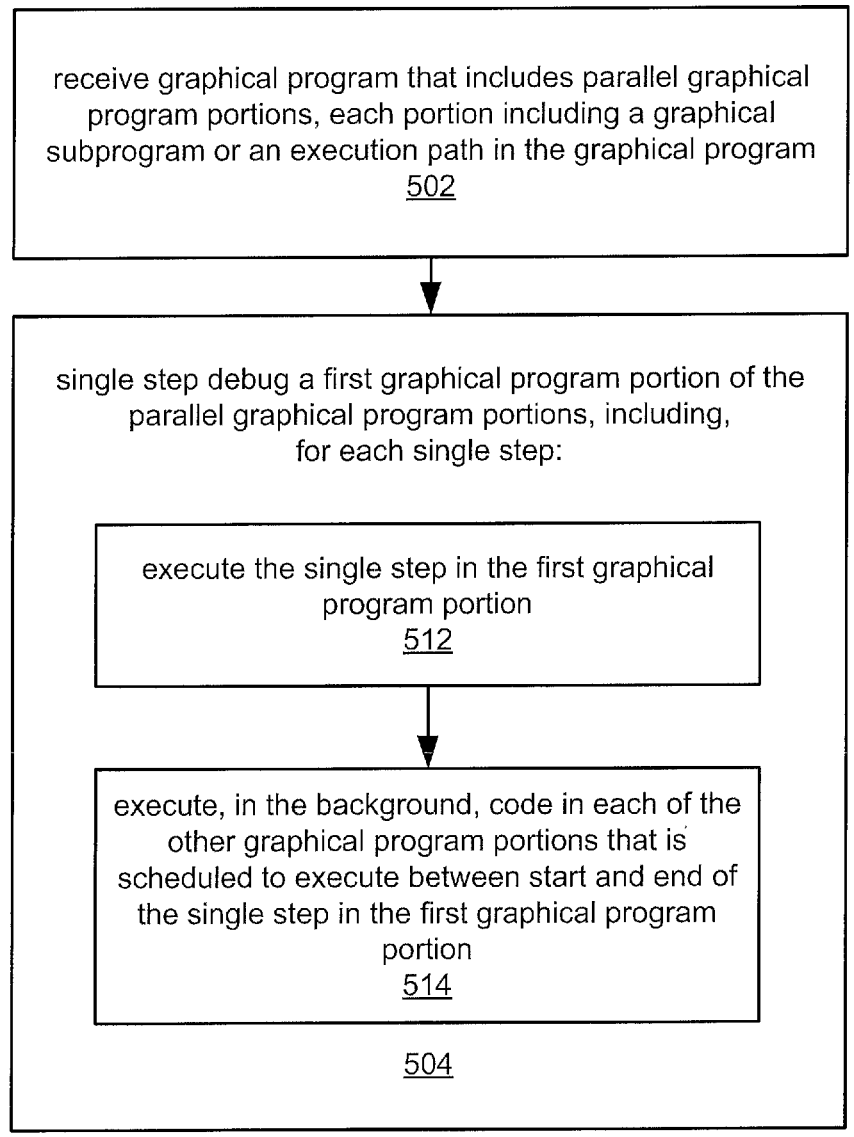
FIG. 5 is a flowchart diagram illustrating one embodiment of a method for debugging parallel graphical program code.

FIG. 5—Method for Debugging Parallel Graphical Program Code

FIG. 5 illustrates a method for debugging parallel graphical program code, according to one embodiment. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

First, in 502, a graphical program may be received, e.g., from storage, from another process or device, etc., where the program includes parallel graphical program portions. Each graphical program portion may include at least one of a graphical program structure or an execution path in the graphical program. In some embodiments, the graphical program may include a plurality of interconnected nodes or icons that visually indicate functionality of the program. The interconnected nodes or icons may thus be graphical source code for the program. Graphical function nodes may also be referred to as blocks, e.g., function blocks. In some embodiments, the graphical program may be a graphical data flow program.

In 504, a first graphical program portion of the parallel graphical program portions may be single step debugged. In some embodiments, single step debugging the first graphical program portion may include executing the single step in the first graphical program portion, as indicated in 512, and executing, in the background, code in each of the other graphical program portions that is scheduled to execute between start and end of the single step in the first graphical program portion, as indicated in 514. As noted in the Terms Section above, single step execution refers to beginning execution from a paused state at a first code element in a program portion, executing the first code element, then pausing at an immediately subsequent second code element in the program portion, e.g., per data flow order, or along a selected execution branch.

In some embodiments, the method may include displaying, on a display device, e.g., via a graphical user interface (GUI), results from the single step debugging, including displaying one or more of: results from said executing the single step, or results from said executing, in the background, the code in each of the other graphical program portions that is scheduled to execute between start and end of the single step in the first graphical program portion. Thus, embodiments of the present techniques may enable the user to single step through graphical program code and observe changes or results in a first graphical program portion while allowing parallel code in the other graphical program portions to execute in the background. In some embodiments, the method may also allow the user to view results from the background execution. For example, the user may specify to the GUI whether to present such "background" results, and the GUI may display such results accordingly, e.g., in a respective window or in respective windows. In one embodiment, results may be annotated to indicate which graphical program portion produced the results.

The single step debugging of 504 may be performed in any of multiple ways. For example, in one embodiment, the first graphical program portion includes a first graphical subprogram, and single step debugging the first graphical program portion includes single step debugging through the first graphical subprogram. In a further embodiment, single step debugging through the first graphical subprogram may include beginning execution from a paused state at a first code element in the first graphical subprogram, executing the first code element, then pausing at an immediately subsequent second code element in the first graphical subprogram, and executing, in the background, all pending code in the graphical program that is not in the first graphical subprogram, and that is concurrent with the first code element or that is scheduled to execute between the first code element and the second code element.

In some embodiments, at least one of the parallel graphical program portions includes a graphical subprogram defined by at least one of: a top level block diagram of the graphical program, at least one loop, at least one clock-driven loop, at least one sequence structure, at least one case structure, at least one replication structure, or at least one nested structure. Further information regarding replication structures may be found in co-pending U.S. application Ser. No. 14/937,732, titled "Replication Structure in a Graphical Programming Language", which was incorporated by reference above.

Figure 6A:
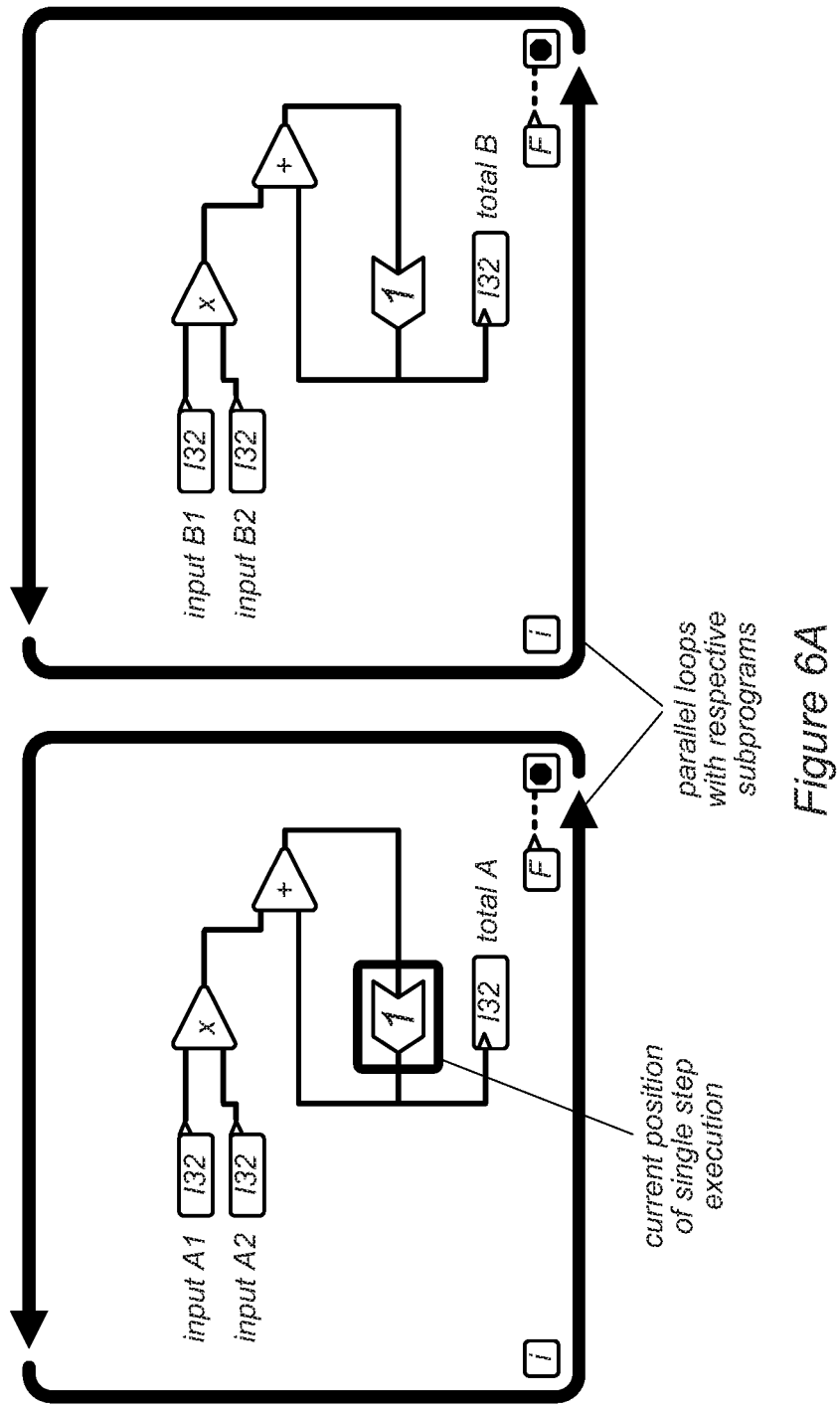
FIG. 6A illustrates a single step execution in an exemplary graphical program that includes parallel loops with respective graphical subprograms, according to one embodiment.

FIG. 6A illustrates a single step execution in an exemplary graphical program that includes parallel loops with respective graphical subprograms, according to one embodiment. As shown, the current position of single stepped execution is visually indicated, in this exemplary embodiment, by a thick rectangle around a graphical program node, specifically, a Feedback node, executable to store the data on its input and return data that was stored from the previous execution. Note, however, that any other type of indication may be used as desired.

Figure 6B:
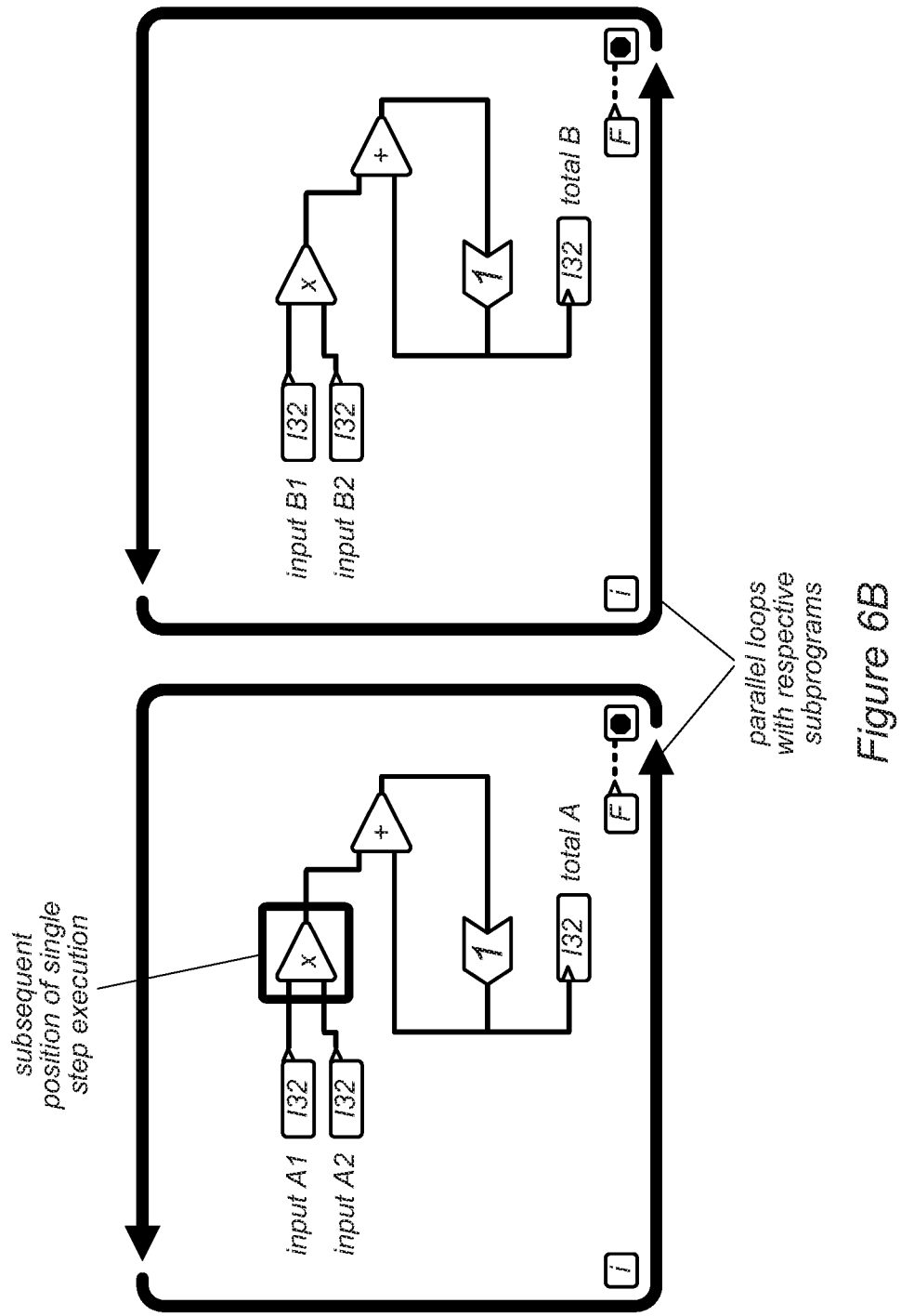
FIG. 6B illustrates a subsequent single step execution in the exemplary graphical program of FIG. 6A, according to one embodiment.

FIG. 6B illustrates a subsequent single step execution in the exemplary graphical program of FIG. 6A, according to one embodiment. In other words, FIG. 6B illustrates the parallel loops of FIG. 6A after performing a single step operation, where the preceding node (the current position of FIG. 6A) has been executed along with any concurrent nodes residing in other graphical subprograms, including the graphical subprogram in the right-hand loop. As may be seen, the subsequent position is a multiply node, as indicated by the thick rectangle around the node. Note that in the particular embodiment shown, the current and subsequent positions (code elements) are executed in the same iteration of the loop, and so the two frames shown illustrate single stepping within a single iteration of the loop. Note further that execution pauses only at another node within the same graphical subprogram as the current position of FIG. 6A.

Thus, some embodiments of the above technique may enable the user to single step through graphical program code and observe changes or results in a single graphical subprogram while allowing parallel code to execute in the background.

In another embodiment, the first graphical program portion may include a first execution path, and single step debugging the first graphical program portion may include single step debugging through the first execution path. For example, in one particular embodiment, single step debugging through the first execution path may include beginning execution from a paused state at a first code element in the first execution path, executing the first code element, then pausing at an immediately subsequent second code element in the first execution path, and executing, in the background, all pending code in the graphical program that is concurrent with the first code element or that is scheduled to execute between the first code element and the second code element.

Figure 7:
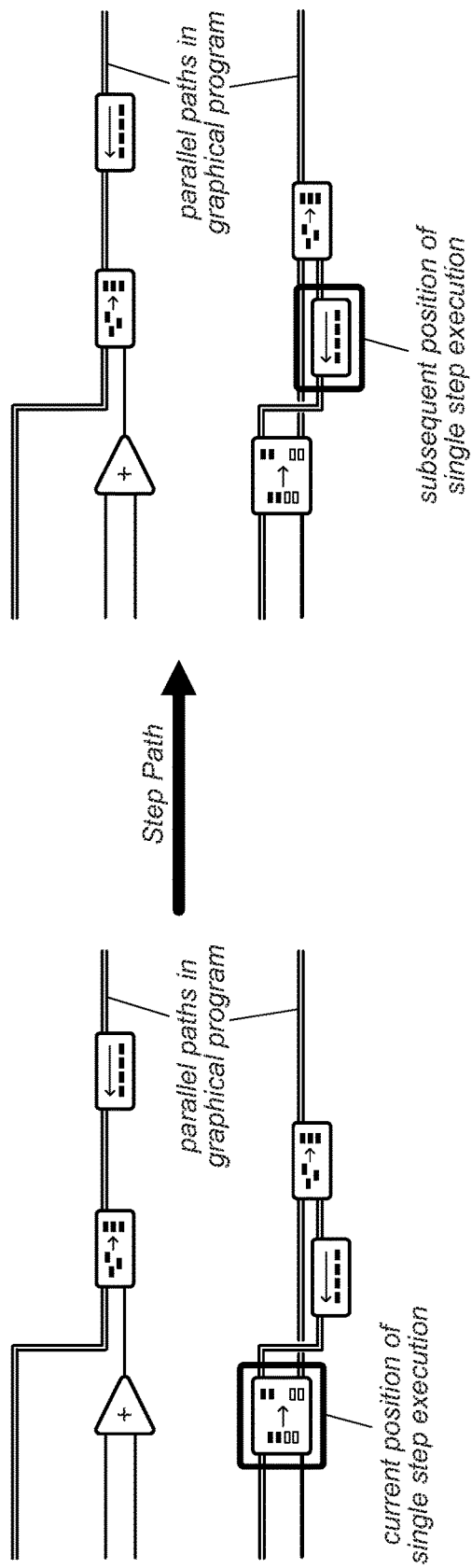
FIG. 7 illustrates single step path execution in a graphical program, according to one embodiment.

FIG. 7 illustrates single step path execution in an exemplary graphical program, according to one embodiment. Said another way, FIG. 7 illustrates an exemplary single step execution path operation in a graphical program where parallel paths are present. Note that only a portion of the graphical program is shown in FIG. 7.

As FIG. 7 shows, the exemplary graphical program includes parallel execution paths, and the left portion of the Figure includes an indication of the current position of a single step execution through the graphical program, specifically, a thick rectangle around a Split Array node in the lower path, which is executable to divide an array into two subarrays. The right side of FIG. 7 illustrates the same portion of the graphical program after a single step along the lower path, where the subsequent position of the single step execution is indicated by the thick rectangle around the next node along the lower execution path. In other words, the rectangle indicates the current node at a given stage of single step execution, and the left and right frames of the Figure show an exemplary presentation to the user before and after a single step execution path operation. Note that, after initiating the single step execution path operation, the program may execute any of the nodes in the parallel path but may only pause execution and interrupt the user when execution reaches a node that lies along a common data path with the node that was active before the operation. Per an embodiment of the above method, code in the upper path that is concurrent or parallel with respect to the single step execution in the lower path may be executed in the background.

A first graphical program portion of the parallel graphical program portions may be debugged by stepping across multiple code elements, code portions, or executing to a code element not immediately following the code element currently paused. The selection of code elements to step or execute to may be an automated or manual process.

In some embodiments, the graphical program may include an execution branch point, i.e., where the execution path forks or ramifies, into parallel execution paths. For example, in one embodiment, the first execution path includes an execution branch point, and single step debugging through the first execution path may further include receiving user input selecting an execution branch of the execution branch point, where the first execution path includes the selected execution branch, and where all pending code includes any unselected execution branches of the execution branch point.

Thus, at least some of the first execution path may be determined at runtime based on user input, and so the subsequent or next code element in the first execution path after the execution branch point may not be known until then. For example, when the execution branch is encountered in the execution of the graphical program, e.g., prior to, during, or just after execution of the code element at the current position, a prompt may be presented to the user requesting disambiguation of the execution branch point, i.e., selection of one of the presented execution branches, and in response to user input disambiguating the execution branching, i.e., selecting or indicating one of the execution branches, may designate the immediately subsequent (next) code element along the selected execution branch as the subsequent position, i.e., the second code element, in the first execution path, and may proceed as described above. Note that the user input may be received in any of various ways, e.g., via a specific key press or key combination, via a pointing device, e.g., a mouse click on a candidate node or path, selection of an entry in a menu of candidate nodes or paths, and so forth, as desired.

Figure 8:
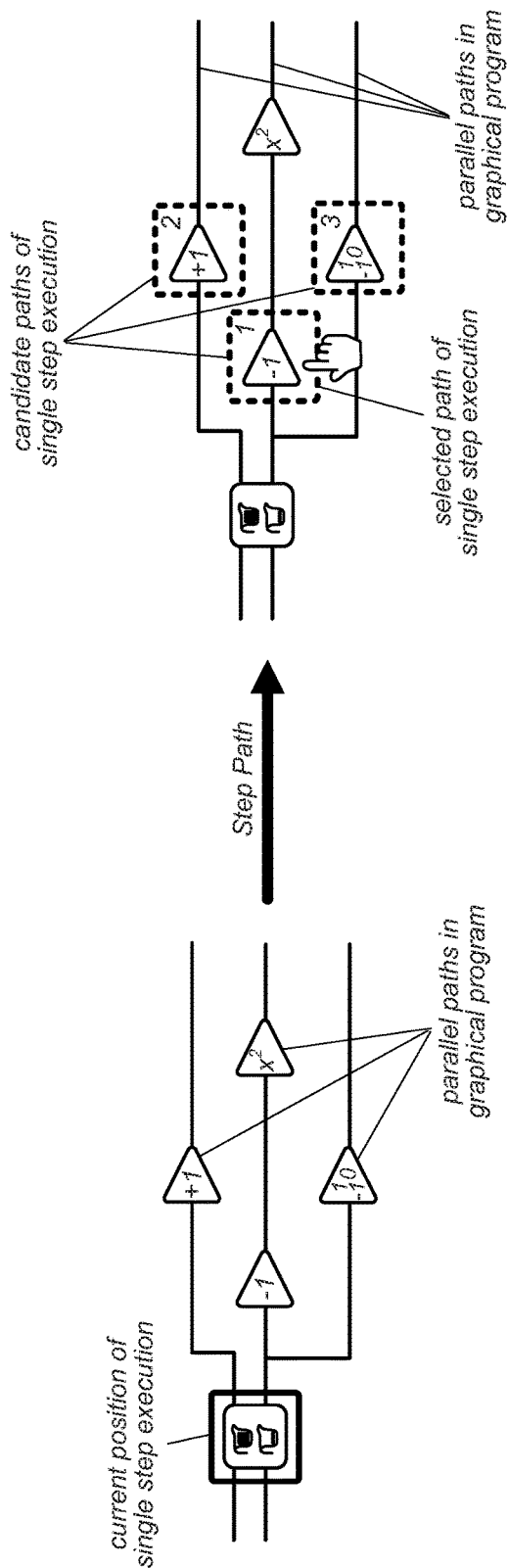
FIG. 8 illustrates disambiguation of single step path execution in a graphical program with parallel paths, according to one embodiment.

FIG. 8 illustrates disambiguation of single step path execution in an exemplary (portion of a) graphical program with parallel paths, according to one embodiment. As shown in the left side of the Figure, the left most node (specifically, a Max/Min node executable to, given two values, return the maximum of the two values on the upper right terminal and the minimum on the lower right terminal) is the current position in the single step execution of the graphical program, and there are three candidate paths of single step execution, i.e., three parallel execution paths from which the user may select (to disambiguate or further define the above first execution path). The candidates are indicated by respective rectangles around the nodes. The right side of FIG. 8 illustrates exemplary selection by the user of the middle execution path, as indicated by the hand-shaped cursor on the first code element (graphical program node) of the middle execution path, but also illustrates an alternative selection mechanism in that each selectable path (or code element) is numbered—see the integer labels in the top right of each rectangle-bounded area, where the user may make a selection by choosing a number, e.g., via a keyboard, menu, etc. In response to user input disambiguating the execution branch point (i.e., selecting the execution path to continue single stepping), the method may proceed with single step execution of the first execution path, which now (dynamically) includes the selected middle execution path.

In other words, FIG. 8 illustrates exemplary disambiguation of a branching single step execution path operation, and specifically illustrates two possible exemplary interactions to specify which path to follow when performing a step path operation at a node that has multiple or branching outputs. The user may press a numeric key to choose the next eligible node or click directly on the desired node, among other selection techniques.

Thus, some embodiments of the above technique may enable the user to single step through graphical program code and observe changes or results in a single execution path while allowing parallel code to execute in the background.

Further Exemplary Embodiments

The following presents further exemplary embodiments of the above techniques, although it should be noted that the embodiments described are exemplary only, and are not intended to limit the invention to any particular form, function, or appearance.

In some applications, parallel paths may interfere with one another through side effects. The debugging of an individual execution path may be affected if these other parallel paths are allowed to execute. In some embodiments, the (debugging) environment may provide a mechanism to disable or lock certain paths from executing to allow other paths to make progress without this interference.

In some embodiments, code may be optimized by a compiler for execution in a way not originally described by the user application. For example, the compiler may be configured to parallelize a code sequence originally specified in a serial fashion. The debugging environment may provide features to allow single stepping of the code in its original serial form or provide a mechanism to execute and debug the code in its optimized form.

In some embodiments, the code portion into which to step may not be shown statically at edit or compile time. For example, a code portion invoked by reference may not be known until runtime. Single stepping or otherwise debugging code portions what are not directly visible on the diagram can be cumbersome, and so in some embodiments, the debugging environment may show the code portion to be executed inline with the surrounding code portions to make the context clearer.

Replication Structure

As noted above, in some embodiments, the graphical program may include at least one replication structure. In some embodiments, users may request a visualization of the instances (replicas) generated by the compiler or runtime. For example, the request may be an adornment on the replication structure, a set of properties in a toolbar, property rail, or menu, or a part of a higher-level visualization showing instances or clones across all features capable of generating instances. This view may be shown at edit, compile, or runtime, as desired. In one embodiment, each instance may be shown in an optimized form such the user may see what the final runtime code looks like. The navigation of this view may allow viewing and interacting with generated instances across similar replication structure instances throughout the application. Users may, for example, set breakpoints, probe values, view analysis such as timing, resource, and/or other estimates or profiled values, etc., on multiple generated instances at once. The data may be filtered through a manual or automated selection process.

As noted above, execution of parallel code portions may interfere with one another. In one embodiment, a single or plurality of replicated code portions contained within a replication structure may be disabled or locked from executing to allow one or more remaining instances (or replicas) to continue execution unencumbered.

In some embodiments, the application may call for instances of a single original code portion, such as those defined by a replication structure. The user may desire to debug by execution (single) stepping, probing, or in other ways analyze or effect execution of a number of instances. In one embodiment, the environment may show a collection, e.g., an array, of values collected for a single probe in the original code portion linked to a number of generated instances of that code portion either at compile or runtime. In another embodiment, the user may desire to set a breakpoint or step execution along M of N generated instances of a code portion where M may or may not be equal to N.

Figure 9A:
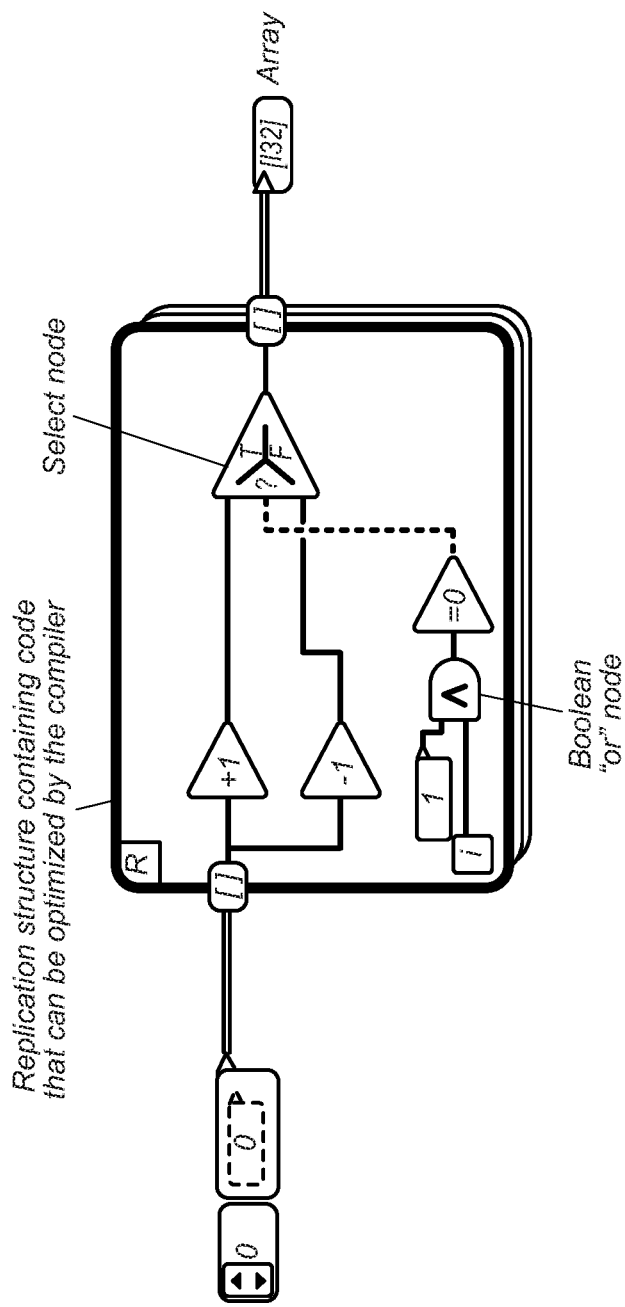
FIG. 9A illustrates an exemplary replication structure in graphical program code contained inside the structure is optimizable, according to one embodiment.

FIG. 9A illustrates a replication structure in which the code contained inside the structure is optimizable depending on the instance ID, e.g., by the compiler. As shown, the included code (e.g., first graphical program code) generates a Boolean value (that is based on an "or" operation with respect to the number (ID) of the instance and a constant (1)), and provides the value to a Select node that provides output to an array accordingly.

Figure 9B:
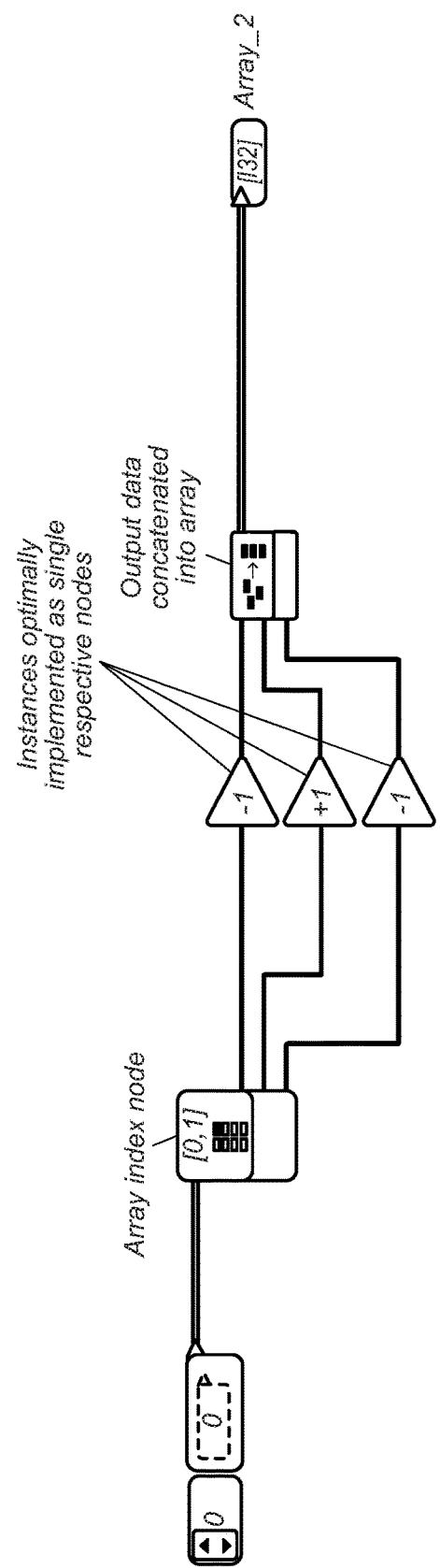
FIG. 9B illustrates an exemplary optimized implementation of the instances generated from the replication structure of FIG. 9A, according to one embodiment.
Figure 9C:
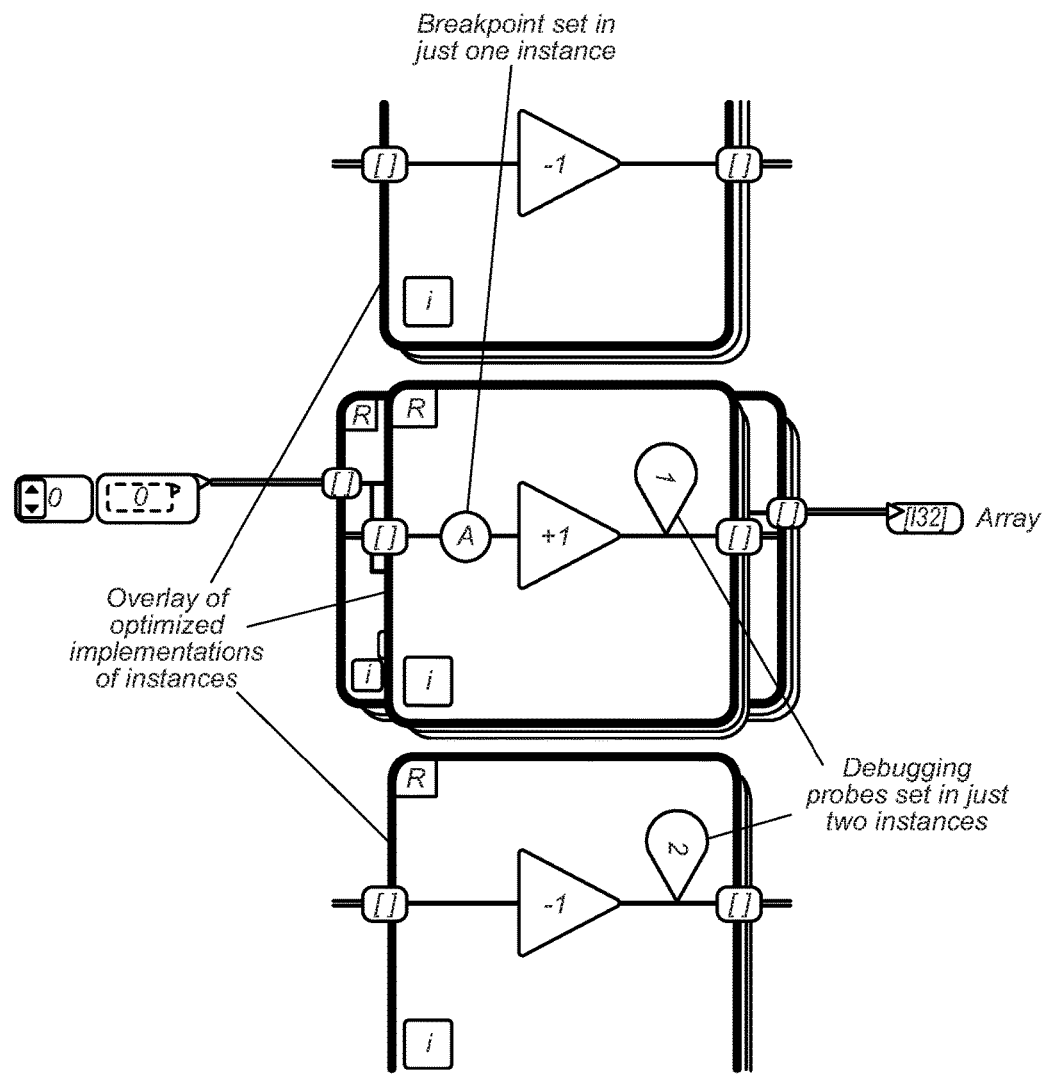
FIG. 9C illustrates an example of visualization of the optimized graphical program code of FIG. 9B, according to one embodiment.

FIG. 9B illustrates an exemplary optimized implementation of the instances, where each instance has been reduced to a single respective code element, so indicated. As shown, an array index node sends respective input data from an input array to each of the instances (respective nodes), and an aggregator node collects results from the instances and concatenates them into an array. FIG. 9C shows an example of the aforementioned visualization. In this exemplary embodiment, the visualization includes an overlay, displayed on top of the original graphical program code, which illustrates the optimized implementations of the instances. In this particular example, the visualization enables the user to set debugging probes or breakpoints in particular instances, as indicated.

This view may be shown at edit, compile, or runtime, as desired. In one embodiment, each instance may be shown in an optimized form such the user may see what the final runtime code looks like. The navigation of this view may allow viewing and interacting with generated instances across similar replication structure instances throughout the application. Users may, for example, set breakpoints, probe values, view analysis such as timing, resource, and/or other estimates or profiled values, etc., on multiple generated instances at once. The data may be filtered through a manual or automated selection process.

General Creation of a Graphical Program

The following describes creation of graphical programs in general, according to some embodiments.

A graphical program may be created on the computer system 82 (or on a different computer system). The graphical program may be created or assembled by the user arranging on a display a plurality of nodes or icons and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons which visually indicates the functionality of the program. As noted above, the graphical program may comprise a block diagram and may also include a user interface portion or front panel portion. Where the graphical program includes a user interface portion, the user may optionally assemble the user interface on the display. As one example, the user may use the LabVIEW™ graphical programming development environment to create the graphical program.

In an alternate embodiment, the graphical program may be created in 502 by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired. The graphical program may implement a measurement function that is desired to be performed by the instrument.

In some embodiments, a graphical user interface or front panel for the graphical program may be created, e.g., in response to user input. The graphical user interface may be created in any of various ways, e.g., depending on the graphical programming development environment used.

It is noted that the graphical user interface and the block diagram may be created separately or together, in various orders, or in an interleaved manner. In one embodiment, the user interface elements in the graphical user interface or front panel may be specified or created, and terminals corresponding to the user interface elements may appear in the block diagram in response. For example, when the user places user interface elements in the graphical user interface or front panel, corresponding terminals may appear in the block diagram as nodes that may be connected to other nodes in the block diagram, e.g., to provide input to and/or display output from other nodes in the block diagram. In another embodiment, the user interface elements may be created in response to the block diagram. For example, the user may create the block diagram, wherein the block diagram includes terminal icons or nodes that indicate respective user interface elements. The graphical user interface or front panel may then be automatically (or manually) created based on the terminal icons or nodes in the block diagram. As another example, the graphical user interface elements may be comprised in the diagram.

The graphical program may be executed on any kind of computer system(s) or reconfigurable hardware, as described above.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A non-transitory computer accessible memory medium that stores program instructions executable by a functional unit to implement:
    receiving a graphical program that includes parallel graphical program portions, wherein each graphical program portion comprises at least one of:
        a graphical subprogram; or
        an execution path in the graphical program; and single step debugging a first graphical program portion of the parallel graphical program portions, comprising:
for each step:
executing the single step in the first graphical program portion of the parallel graphical program; and
executing, concurrently and in the background, code in each of the other graphical program portions of the parallel graphical program scheduled to execute between start and end of the single step in the first graphical program portion.

2. The non-transitory computer accessible memory medium of claim 1, wherein the first graphical program portion comprises a first graphical subprogram, wherein said single step debugging the first graphical program portion comprises single step debugging through the first graphical subprogram.

3. The non-transitory computer accessible memory medium of claim 2, wherein said single step debugging through the first graphical subprogram comprises:
beginning execution from a paused state at a first code element in the first graphical subprogram, executing the first code element, then pausing at an immediately subsequent second code element in the first graphical subprogram; and
executing, in the background, all pending code in the graphical program that is not in the first graphical subprogram, and that is concurrent with the first code element or that is scheduled to execute between the first code element and the second code element.

4. The non-transitory computer accessible memory medium of claim 1, wherein at least one of the parallel graphical program portions comprises a graphical subprogram defined by at least one of:
a top level block diagram of the graphical program;
at least one loop;
at least one clock-driven loop;
at least one sequence structure;
at least one case structure;
at least one graphical subprogram in a replication structure; or
at least one nested structure.

5. The non-transitory computer accessible memory medium of claim 1, wherein the first graphical program portion comprises a first execution path, wherein said single step debugging the first graphical program portion comprises single step debugging through the first execution path.

6. The non-transitory computer accessible memory medium of claim 5, wherein said single step debugging through the first execution path comprises:
beginning execution from a paused state at a first code element in the first execution path, executing the first code element, then pausing at an immediately subsequent second code element in the first execution path; and
executing, in the background, all pending code in the graphical program that is concurrent with the first code element or that is scheduled to execute between the first code element and the second code element.

7. The non-transitory computer accessible memory medium of claim 5,
wherein the first execution path comprises an execution branch point, and wherein said single step debugging through the first execution path further comprises:
receiving user input selecting an execution branch of the execution branch point, wherein the first execution path comprises the selected execution branch;
wherein said all pending code includes any unselected execution branches of the execution branch point.

8. The non-transitory computer accessible memory medium of claim 1, wherein the program instructions are further executable to implement:
displaying, on a display device, results from said single step debugging, including displaying one or more of:
results from said executing the single step; or
results from said executing, in the background.

9. The non-transitory computer accessible memory medium of claim 1,
wherein the graphical program comprises a graphical data flow program.

10. The method of claim 1,
wherein the graphical program is configured to perform one or more of:
an industrial automation function;
a process control function; or
a test and measurement function.

11. A computer-implemented method for debugging a graphical program, the method comprising:
receiving a graphical program that includes parallel graphical program portions, wherein each graphical program portion comprises at least one of:
a graphical subprogram; or
an execution path in the graphical program; and
single step debugging a first graphical program portion of the parallel graphical program portions, comprising:
for each step:
executing the single step in the first graphical program portion of the parallel graphical program; and
executing, concurrently and in the background, code in each of the other graphical program portions of the parallel graphical program scheduled to execute between start and end of the single step in the first graphical program portion.

12. The computer-implemented method of claim 11, wherein the first graphical program portion comprises a first graphical subprogram, wherein said single step debugging the first graphical program portion comprises single step debugging through the first graphical subprogram.

13. The computer-implemented method of claim 12, wherein said single step debugging through the first graphical subprogram comprises:
beginning execution from a paused state at a first code element in the first graphical subprogram, executing the first code element, then pausing at an immediately subsequent second code element in the first graphical subprogram; and
executing, in the background, all pending code in the graphical program that is not in the first graphical subprogram, and that is concurrent with the first code element or that is scheduled to execute between the first code element and the second code element.

14. The computer-implemented method of claim 11, wherein at least one of the parallel graphical program portions comprises a graphical subprogram defined by at least one of:
a top level block diagram of the graphical program;
at least one loop;
at least one clock-driven loop;
at least one sequence structure;
at least one case structure;
at least one graphical subprogram in a replication structure; or
at least one nested structure.

15. The computer-implemented method of claim 11, wherein the first graphical program portion comprises a first execution path, wherein said single step debugging the first graphical program portion comprises single step debugging through the first execution path.

16. The computer-implemented method of claim 15, wherein said single step debugging through the first execution path comprises:
- beginning execution from a paused state at a first code element in the first execution path, executing the first code element, then pausing at an immediately subsequent second code element in the first execution path; and
- executing, in the background, all pending code in the graphical program that is concurrent with the first code element or that is scheduled to execute between the first code element and the second code element.

17. The computer-implemented method of claim 15, wherein the first execution path comprises an execution branch point, and wherein said single step debugging through the first execution path further comprises:
- receiving user input selecting an execution branch of the execution branch point, wherein the first execution path comprises the selected execution branch;
- wherein said all pending code includes any unselected execution branches of the execution branch point.

18. The computer-implemented method of claim 11, further comprising:
- displaying, on a display device, results from said single step debugging, including displaying one or more of:
  - results from said executing the single step; or
  - results from said executing, in the background.

19. The computer-implemented method of claim 11, wherein the graphical program comprises a graphical data flow program.

20. The computer-implemented method of claim 11, wherein the graphical program is configured to perform one or more of:
- an industrial automation function;
- a process control function; or
- a test and measurement function.

\* \* \* \* \*